United States Patent [19]
Grattier

[11] Patent Number: 5,154,879
[45] Date of Patent: Oct. 13, 1992

[54] FUEL ASSEMBLY OF A NUCLEAR REACTOR COMPRISING A DEVICE FOR RETAINING PARTICLES CONTAINED IN THE COOLING FLUID OF THE REACTOR

[75] Inventor: Bernard Grattier, Dardilly, France

[73] Assignees: Framatome; Cogema, both of France

[21] Appl. No.: 530,296

[22] Filed: May 30, 1990

[30] Foreign Application Priority Data

Jun. 2, 1989 [FR] France ................ 89 07346

[51] Int. Cl.⁵ .............................................. G21C 3/32
[52] U.S. Cl. ............................. 376/352; 376/313; 376/437
[58] Field of Search ............... 376/313, 352, 438, 437, 376/444

[56] References Cited

U.S. PATENT DOCUMENTS 3,820,226 6/1974 Nakazato .................... 29/428
4,844,860 7/1989 Hatfield ....................... 376/439
4,873,051 10/1989 Duncan et al. ............. 376/438

FOREIGN PATENT DOCUMENTS 0213813 11/1987 European Pat. Off.
1464970 7/1970 Fed. Rep. of Germany.

Primary Examiner—Brooks H. Hunt
Assistant Examiner—Meena Chelliah
Attorney, Agent, or Firm—Pollock, Vande Sande & Priddy

[57] ABSTRACT

The particle retaining device comprises a plurality of tubes (18) parallel to fuel rods (14) of the fuel assembly, in all gaps between adjacent fuel rods (14) and throughout the length of a zone located between the upper part of a bottom nozzle (2) and the lower part of the spacer grid which is closest to the bottom nozzle (2).

14 Claims, 2 Drawing Sheets

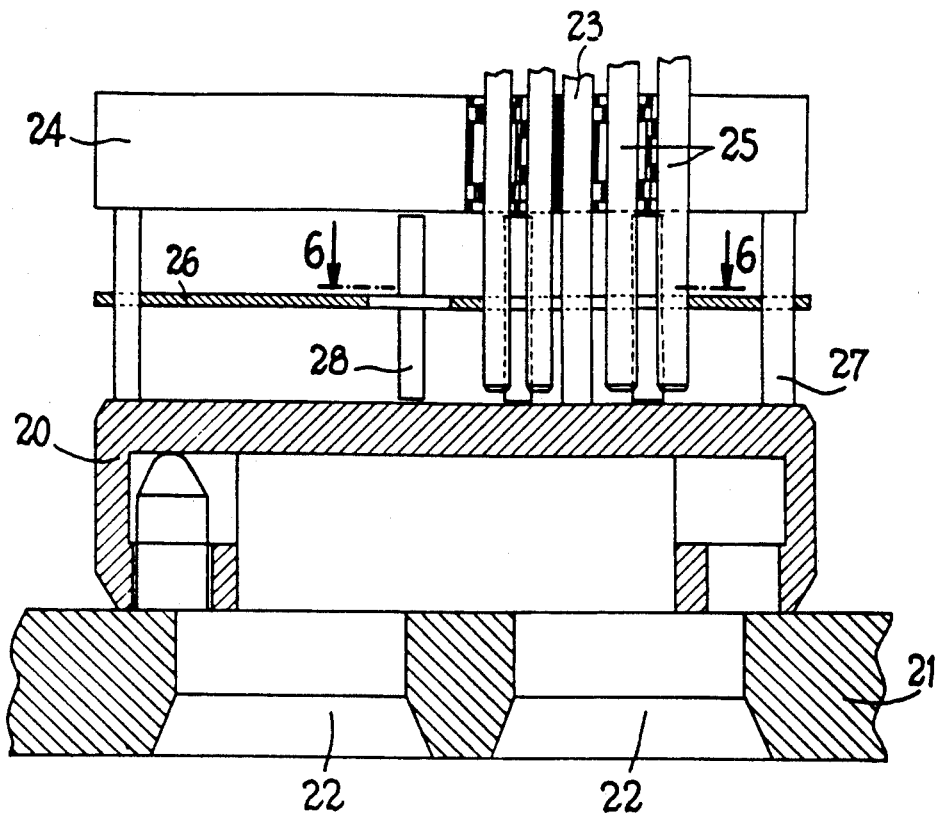
FIG_5
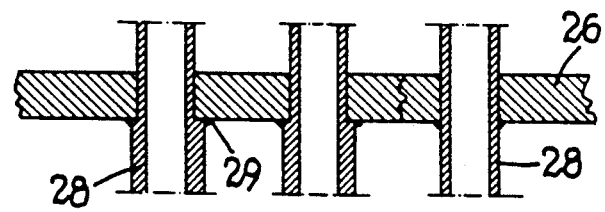
FIG_7
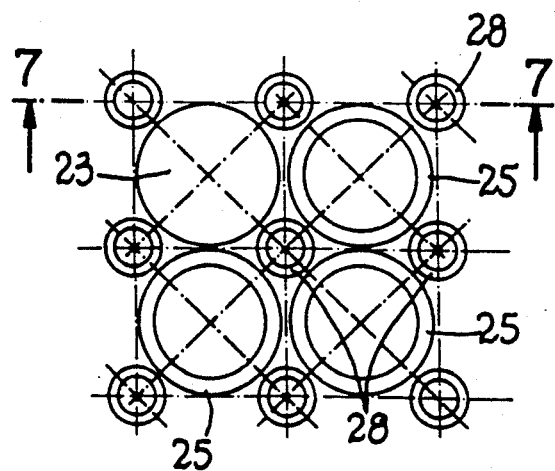
FIG_6

FUEL ASSEMBLY OF A NUCLEAR REACTOR COMPRISING A DEVICE FOR RETAINING PARTICLES CONTAINED IN THE COOLING FLUID OF THE REACTOR

FIELD OF THE INVENTION

The invention relates to a fuel assembly of a nuclear reactor comprising a device for retaining particles contained in the cooling fluid of the reactor.

BACKGROUND OF THE INVENTION

Water cooled nuclear reactors, and in particular nuclear reactors cooled with pressurized water, comprise a core constituted by prismatic assemblies disposed side by side and vertically. Each of the fuel assemblies is constituted by a cluster of parallel fuel rods maintained in a framework.

The framework of the fuel assembly is constituted by a plurality of transverse spacer grids spaced apart along the length of the assembly and maintaining the rods in a regular network in cross-sectional planes of the cluster. The spacer grids are interconnected by longitudinal guide tubes which are substituted for the fuel rods in some of the cells of the spacer grids and fixed to the latter.

The framework of the assembly also comprises two end nozzles connected to the end of the guide tubes whose length exceeds the length of the fuel rods.

One of the nozzles of the assembly, termed the bottom nozzle, rests on the bottom plate of the core of the reactor which is provided with apertures in the region of each of the assemblies to permit the passage of the cooling water of the reactor through the core in the vertically upward direction.

The cooling fluid of the fuel rods passes through the adaptor plate of the bottom nozzle through openings termed water passages which are either of circular shape (with a diameter of about 7 to 10 mm) or oblong (openings which are about 10 mm wide and 15 to 50 mm long). Fragments which may be present in the primary circuit of the reactor are liable to be carried along by the circulating water under pressure and, in the event that their size is small (for example, less than 10 mm), these fragments may pass through the adaptor plate of the bottom nozzle whose water passages have a large section, and may become wedged between the fuel rods and the cells of the first grid, i.e., the spacer grid which is the closest to the bottom nozzle.

These fragments, subjected to the axial and transverse hydraulic forces which are high in this zone, may cause wear of the sheathing of the fuel rod. There is consequently a risk of impairment of the fluid-tightness of this sheathing and an increase in the rate of activity of the primary circuit of the reactor.

Devices have therefore been proposed for filtering the cooling fluid of the reactor either during tests under hot conditions or during the operation of the reactor.

In the first case, the filtering elements may be connected to the bottom core plate and arranged on the latter in the position of the fuel assemblies before loading the core.

In the second case, the filtering elements are associated with the fuel assemblies and located in their lower part. These filtering elements may be formed by structures of sheet metal or metal wires disposed in the bottom nozzle of the assembly for arresting fragments whose size exceeds the largest dimension of the section of the passage between a fuel rod and a cell of the grid.

Such devices may be complicated and result in a relatively large pressure drop in the circulation of the cooling fluid through the fuel assembly.

Further, these devices placed in the bottom nozzle of the assembly may be relatively bulky and constitute an obstacle when loading and unloading the assemblies of the core and when connecting or disconnecting the guide tubes and the bottom nozzle.

SUMMARY OF THE INVENTION

An object of the invention is therefore to provide a fuel assembly of a water cooled nuclear reactor comprising a framework of elongated shape constituted by a plurality of transverse spacer grids spaced along the length of the assembly, longitudinal guide tubes fixed to the spacer grids and two transverse end nozzles, a cluster of parallel fuel rods having a longitudinal direction and maintained by the spacer grids so as to constitute a regular network in crosssectional planes parallel to the grids and perpendicular to the guide tubes, and a device for retaining particles contained in the cooling water of the reactor located in the lower part of the assembly, i.e., in the part closest to the end nozzle which in service rests on the bottom plate of the core of the reactor, termed bottom nozzle, an effective filtration of the cooling water of the reactor being achieved by the retaining device without resulting in an excessive pressure drop in the circulation of the cooling fluid, without increasing the size of the fuel assembly in the region of the bottom nozzle thereof, and allowing possible dismantling of said nozzle.

For this purpose, the particle retaining device comprises a plurality of tubes disposed parallel to the fuel rods of the assembly in all of the gaps between adjacent rods and throughout the length of a zone located between the upper part of the bottom nozzle of the assembly and the lower part of the first spacer grid, i.e., the spacer grid which is the closest to the bottom nozzle.

BRIEF DESCRIPTION OF THE DRAWINGS

In order that the invention, may be more clearly understood, several embodiments of a fuel assembly according to the invention will now be described by say of example with reference to the accompanying drawings.

FIG. 5 is an elevational view partly in section of the lower part of a fuel assembly according to the invention and in an embodiment different from the embodiment shown in FIG. 1 to 4.

FIG. 6 is a plan view along line 6——6 of FIG. 5.

FIG. 7 is a sectional view taken along line 7——7 of FIG. 6.

DETAILED DESCRIPTION

Figure 1:
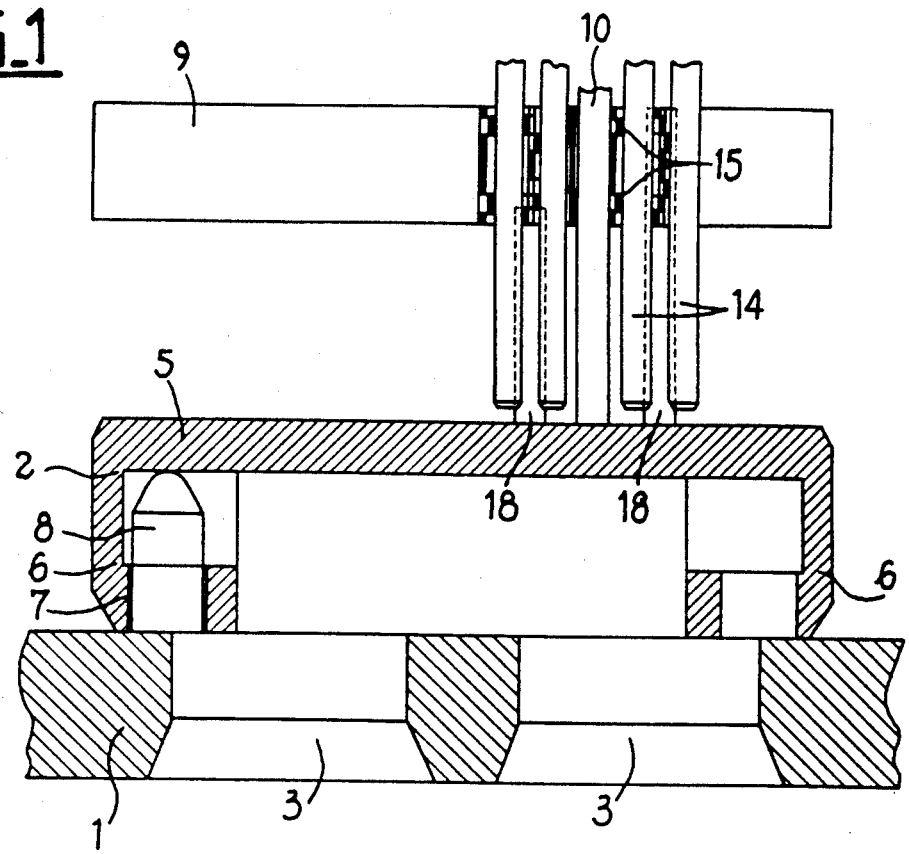
FIG. 1 is an elevational and sectional view in a vertical plane of the lower part of a fuel assembly according to the invention, comprising a particle retaining device.

FIG. 1 shows the lower part of a fuel assembly according to the invention resting on the bottom core plate 1 of a nuclear reactor through its bottom nozzle 3.

The bottom core plate 1 has extending therethrough water passage ports 3 opening out below the bottom nozzle 2 of the fuel assembly. The bottom nozzle 2 has an adaptor plate 5 and support feet 6 whose lower part rests on the bottom core plate 1. Two of the support feet 6 located on a diagonal of the square-shaped nozzle include passages 7 for a positioning pillar 8 fixed to the upper side of the bottom core plate 1.

The framework of the fuel assembly comprises a group of spacer grids such as the grid 9 shown in FIG. 1, connected to guide tubes 10 extending in the longitudinal direction.

The spacer grids are evenly spaced apart along the longitudinal direction of the assembly corresponding to the longitudinal direction of the guide tubes 10.

FIG. 1 only shows the bottom or first spacer grid 9, i.e., the spacer grid which is closest to the bottom nozzle 2 through which the fuel assembly bears against the bottom core plate.

Figure 2:
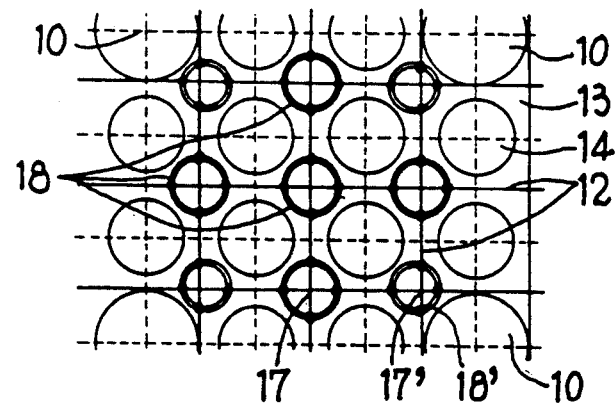
FIG. 2 is a partial plan view of the first spacer grid of the fuel assembly shown in FIG. 1.

As shown in FIG. 2, the spacer grids are formed by small plates 12 assembled at right angles and defining cells 13 of a network of square-shaped meshes in which the fuel rods 14 are placed, these rods being maintained inside the cells by elements 15 which project relative to the plates defining the cells and constitute either maintaining bosses or springs.

Some cells 13 of the network of the grid receive a guide tube 10 instead of a fuel rod 14. The guide-tubes 10 have a diameter greater than the diameter of the rods 14, and are generally fixed by welding to the plates defining the respective cell.

The guide tubes 10 are also longer than the rods 14 and are fixed at their ends to the nozzles of the fuel assembly. Specifically, the lower ends of the guide tubes 10 are fixed to the adaptor plate 5 of the bottom nozzle 2.

The ends of the fuel rods 14 are at a certain distance from the adaptor plate of the nozzles. According to the invention, tubes 18 are fixed in all of the gaps between four adjacent rods 14 of the assembly.

The tubes 18 extend throughout the length of the zone between the upper side of the adaptor plate 5 of the bottom nozzle and the lower side of the bottom grid 9.

Tubes 18' which are placed in a gap between three adjacent fuel rods 14 and a guide tube 10 have a smaller diameter than the other tubes 18 located in a gap between four adjacent fuel rods 14.

The tubes 18 are centered on the cross-shaped structures 17 of the grid common to the four cells 13 of the grid in which the four adjacent fuel rods 14 are placed.

The tubes 18' are slightly off-set relative to the center of the corresponding cross-shaped structure 17' of the grid in the direction toward the fuel rod 14 located in a position opposite to the guide tube 10 on the diagonals of the cells 13.

The tubes 18 and 18' divide up the gap between four fuel rods, or between three fuel rods and a guide tube, of the assembly in such manner as to preclude the passage of particles of a certain size between the fuel rods 14 and the walls of the cells 13.

The particles contained in the cooling water passing through the bottom core plate and the bottom nozzle 2 through the adaptor plate 5 are therefore retained in the region of the adaptor plate and do not enter the fuel assembly, and therefore do not become wedged between the fuel rods and the walls of the cells 13 of the first spacer grid.

Figure 3:
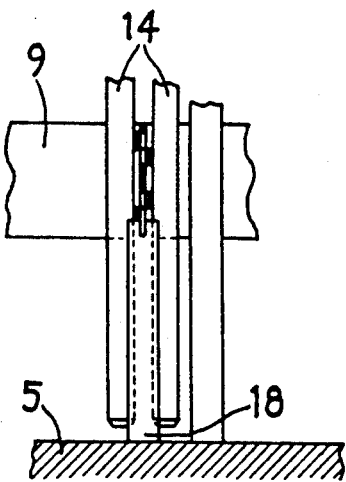
FIG. 3 is a partial elevational and sectional view of the lower part of a fuel assembly according to the invention, showing the manner in which the tubes of the retaining device are fixed to the first spacer grid, in a first embodiment.

FIG. 3 shows a tube 18 of the particle retaining device interposed between the adaptor plate 5 of the nozzle of a fuel assembly and the first spacer grid 9. The tube 18 is interposed between adjacent fuel rods 14 and fixed by its upper end to the small plates 12 defining the cells 13 of the spacer grid 9. For this purpose, the tube 18 is slotted in its upper part along four generatrices, the slots being then engaged on the plates 12 of the grid 9 constituting a cross-shaped structure in the region of which the tube 18 is positioned.

The tube 18 is then welded to the plates of the spacer grid 9. The welding may be achieved by an electron beam or a laser beam. The materials constituting the grid and the tubes of the retaining device may be identical or at least weldable to each other. The grid-engaging slots of the tubes 18 may have a length of about 3 to 5 mm.

Figure 4:
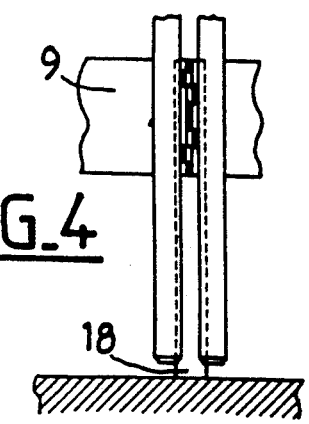
FIG. 4 is a partial elevational and sectional view of the lower part of a fuel assembly according to the invention, showing the manner in which the tubes of the retaining device are fixed, in a second embodiment.

The tubes 18 are not easily welded to the lower part of the spacer grid 9, and it may be advantageous to provide, in the upper part of the tubes 18, slots whose length is substantially equal to the height of the spacer grid 9. In this case, the tube 18, as can be seen in FIG. 4, is engaged in the spacer grid 9 up to the upper part thereof. The welding of the tubes 18 may also be effected by an electron beam or a laser beam in the upper part of the tubes 18, in the region of the upper side of the spacer grid 9.

Depending on the type of fuel assembly in which the retaining device is mounted and depending on the manner of fixing the tubes, the tubes 18 or 18' will have a length of the order of 50 to 80 mm.

When these tubes are solely fixed to the bottom grid of the assembly by one of their ends, they are liable to start vibrating under the effect of the hydraulic forces created by the cooling fluid circulating in the assembly.

A fracture may result from fatigue of the welded connections between the tubes 18 and the cross-shaped structures of the grid 9.

FIGS. 5, 6, and 7 show an embodiment of the lower part of a fuel assembly comprising a retaining device formed by tubes which avoids the vibration of the tubes under the effect of hydraulic forces.

The fuel assembly bears, through its bottom nozzle 20, on the bottom core plate 21 through which extend water passage ports 22 in the region of the fuel assembly.

The guide tubes 23 of the fuel assembly are connected at their lower end to the adaptor plate of the nozzle 20 and fixed to the different spacer grids disposed along the length of the assembly. FIG. 5 shows solely the bottom spacer grid 24 and the bottom ends of the fuel rods 25 maintained by this spacer grid in accordance with a regular network, as can be seen in FIG. 6.

Some of the cells of the spacer grid receive a guide tube 23 instead of a fuel rod 25.

As can be seen in FIG. 5, the lower part of the fuel assembly comprises in addition a support plate 26 which is parallel to the spacer grid 24 and to the adaptor plate of the nozzle 20 of the assembly and placed approximately at equal distances from the upper side of the adaptor plate and the lower side of the spacer grid.

This plate 26 is maintained by spacer tubes 27 fixed at one of their ends to the adaptor plate of the nozzle 20, and at their other end to the lower part of the spacer grid 24.

The support plate 26 is fixed by welding to the spacer tubes 27 in the region of openings extending through the plate 26.

The plate 26 also includes a network of openings for the passage of the lower part of the guide tubes 23 and the fuel rods 25.

Lastly, the plate 26 includes openings centered on the vertical axis of the cross-shaped structures of the grid and in which tubes 28 constituting the particle retaining device of the fuel assembly are engaged.

The tubes 28 are fixed by welding in the region of the through-openings therefor in the support plate 26.

The length of the tubes 28 is a little less than the length of the spacer tubes 27, the lower end of these tubes 28 being located a little above the upper side of the adaptor plate of the nozzle 20, and the upper end of the tubes 28 being substantially in the plane of the lower side of the spacer grid 24.

As can be seen in FIG. 6, each of the tubes 28 divides up a gap between four adjacent fuel rods 25 of the assembly or between three adjacent fuel rods 25 and a guide tube 23, in such manner as to leave no free passage of large size between the rods.

The particles carried along by the cooling fluid of the reactor having a size larger than a certain predetermined size are therefore stopped in the region of the adaptor plate of the nozzle 20. These particles are therefore unable to become lodged around fuel rods in the spacer grid 24.

Further, the tubes 28, which are welded in their central part to the support plate 26, are much less subject to vibrations than the tubes 18 shown in FIGS. 3 and 4 which are fixed by one of their ends to the spacer grid.

As shown in FIG. 7, the tubes 28 may include a shoulder 29 which bears against the lower side of the support plate 26 and along which a weld is effected between the tube 28 and the plate 26. In this way, the tubes are attached more firmly than in the case of a tube 28 which has no shoulder and is welded to the lower side of the plate 26.

Further, in this embodiment, it is possible to make the tubes 28 from a material other than the material of the bottom spacer grid 24. It is merely necessary, that the tubes 28 and the plate 26 be of the same material or materials which are weldable to each other.

The connection between the tubes 28 and the plate 26 may also be achieved by brazing.

In a first stage, the tubes 28 may be assembled and welded or brazed to the plate 26. The resulting unit is then placed in the lower part of the assembly between the nozzle and the bottom spacer grid.

In order to avoid any axial movement of the unit constituted by the support plate 26 and tubes 28, the support plate may be fixed to the spacer tubes 27 interposed between the nozzle and the bottom spacer grid in the corners of the fuel assembly.

In the construction of the tubes of the particle retaining device and the support plate, materials may be employed which have good resistance in the ambient conditions of the nuclear reactor, such as nickel-base alloys with structural hardening or martensitic steels.

The tubes of the retaining device may be attached to the bottom spacer grid by other means or to the adaptor plate of the nozzle, or to one or several intermediate plates, or to other support means.

The invention is applicable to any fuel assembly of a water cooled nuclear reactor.

What is claimed is:

1. Fuel assembly of a water cooled nuclear reactor, said assembly comprising a framework of elongated shape including a plurality of transverse spacer grids spaced apart from one another longitudinally of the assembly, guide tubes extending longitudinally of the assembly and fixed to the spacer grids, and two transverse end nozzles, a cluster of parallel fuel rods extending longitudinally of the assembly and maintained by the spacer grids so as to constitute a regular network in parallel cross-sectional planes parallel to the grids and perpendicular to the guide tubes, adjacent rods of said rods defining gaps therebetween, and a device for retaining particles contained in cooling water for the reactor, said device being located in a lower part of the assembly in the vicinity of a bottom nozzle of said end nozzles traversed by through-openings for cooling water of the reactor, said particle retaining device comprising a plurality of tubes which are parallel to the fuel rods of the assembly and disposed in each of said gaps between an upper part of said bottom nozzle and a lower part of a bottom spacer grid of said spacer grids which is closest to said bottom nozzle, the tubes dividing each of the gaps between the rods into passages for the cooling water of the reactor in such a manner as to preclude the passage of particles of a predetermined size through the lower grid.

2. Fuel assembly according to claim 1, wherein the bottom spacer grid comprises cross-shaped structures and the tubes of the particle retaining device comprise in an end zone of the tubes four slots which are engaged on the cross-shaped structures in the vicinity of a lower side of the bottom spacer grid, and welds fix the tubes to the bottom spacer grid in the vicinity of the lower side of the bottom spacer grid.

3. Fuel assembly according to claim 1, wherein the bottom spacer grid comprises cross-shaped structures, the tubes of the particle retaining device each comprise four slots on generatrices of an upper part of the tubes, the length of the slots being at least equal to a dimension of the bottom spacer grid in the longitudinal direction of the assembly, the end zones of the tubes are engaged on said cross-shaped structures of the grid, and welds fix said end zones of the tubes to said bottom spacer grid in the vicinity of an upper side of said bottom spacer grid.

4. Fuel assembly according to claim 2, wherein the tubes are welded to the bottom spacer grid by an electron beam.

5. Fuel assembly according to claim 2, wherein the tubes are welded to the bottom spacer grid by a laser beam.

6. Fuel assembly according to claim 3, wherein the tubes are welded to the bottom spacer grid by an electron beam.

7. Fuel assembly according to claim 3, wherein the tubes are welded to the bottom spacer grid by a laser beam.

8. Fuel assembly according to claim 1, wherein the bottom nozzle comprises an adaptor plate and the particle retaining device comprises a transverse support plate fixed in an intermediate position between the adaptor plate and a lower side of the bottom spacer grid, and the tubes of the particle retaining device are fixed by a median part of the tubes to the transverse support plate.

9. Fuel assembly according to claim 8, wherein the tubes are welded to the transverse support plate by an electron beam.

10. Fuel assembly according to claim 8, wherein the tubes are welded to the transverse support plate by a laser beam.

11. Fuel assembly according to claim 8, wherein the tubes are fixed to the transverse support plate by brazing.

12. Fuel assembly according to claim 8, wherein second tubes longer than the first-mentioned tubes are fixed on peripheral portions of the transverse support plate so as to constitute spacer means maintaining the particle retaining device between the bottom nozzle and the bottom spacer grid.

13. Fuel assembly according to claim 1, wherein the particle retaining device is made of a nickel alloy having a structural hardening.

14. Fuel assembly according to claim 1, wherein the particle retaining device is made of a martensitic steel.

* * * * *